United States Patent [19]

Armandillo et al.

[11] Patent Number: 4,682,893

[45] Date of Patent: Jul. 28, 1987

[54] OPTICAL INTERFEROMETER WITH DISPERSION DEVIATOR

[75] Inventors: Errico Armandillo, Frascati; Gianemilio Salvetti; Giampiero Giuliani, both of Rome, all of Italy

[73] Assignee: Comitato Nazionale per la Ricerca e per lo Sviluppo dell'Energie, Nucleare e delle Energie Alternative - ENEA, Rome, Italy

[21] Appl. No.: 729,114

[22] Filed: Apr. 30, 1985

[30] Foreign Application Priority Data

Apr. 30, 1984 [IT] Italy ........................ 48112 A/84

[51] Int. Cl.$^4$ .................... G01B 11/02; H01S 3/08
[52] U.S. Cl. .................... 356/356; 372/102
[58] Field of Search ........... 356/345, 347, 348, 354, 356/355, 356; 250/550, 216, 578, 237 R, 237 G; 350/3.6, 3.83, 3.84, 162.11, 162.2, 162.21, 162.22, 162.23, 162.24, 163, 170, 173, 286, 162.17, 171; 372/102

[56] References Cited

U.S. PATENT DOCUMENTS

| | | | |
|---|---|---|---|
| 3,090,279 | 5/1963 | Chisholm | 356/354 |
| 3,332,314 | 7/1967 | Rosenthal | 372/100 X |
| 3,443,871 | 5/1969 | Chitayat | 356/345 |
| 3,611,181 | 10/1971 | Lary et al. | 372/108 X |
| 4,009,940 | 3/1977 | Ohzu | 356/354 X |
| 4,502,144 | 2/1985 | Suhre | 372/102 X |

OTHER PUBLICATIONS

Kingslake R.; "Applied Optics and Engineering", Academic Press, N.Y. and London (1969), vol. 5, part II, pp. 43-44.

"Single-Mode, Tunable Operation of a XeF Excimer Laser Employing an Original Interferometer", Armandillo et al, Optics Letters, vol. 9, p. 327, Aug. 1984.

"Multipass Grating Interferometer as Output Coupler for Tunable, Single-Mode Operation of Large-Bandwidth Lasers", Giuliani et al, Optics Letters, vol. 10, No. 12, Dec. 1985.

Primary Examiner—Eugene R. LaRoche
Assistant Examiner—David Mis
Attorney, Agent, or Firm—Stevens, Davis, Miller & Mosher

[57] ABSTRACT

An interferometer wherein the deviator element, that is the means whereby the interferometer optical elements are optically coupled together, the incident beam is admitted into the interferometer, and the beams to be made to interfere with one another are extracted therefrom comprises, according to a first embodiment a prism whose faces are uncoated and according to a second embodiment a diffraction grating. Basing on the above concept various optical arrangements are described which are referable to known arrangements such for instance the Fox-Smith, the Michelson, the Petrun'kin interferometers wherein the deviator element is replaced, according to this invention by a prism or by a diffraction grating functioning as reflectors. Specifically the use is disclosed of an interferometer as an output coupler of a laser optical resonator.

14 Claims, 23 Drawing Figures

OPTICAL INTERFEROMETER WITH DISPERSION DEVIATOR

The present invention relates to interferometers wherein the splitting of the incident beam into the beams which are to be made to interfere with one another is achieved by means of deviators which consist of reflection gratings or of prisms.

Interferometers comprising one or more reflecting surfaces according to the Fabry-Perot, Fox-Smith Michelson, Petrun'kin (A,B,C,D in FIG. 1) types are well known. The operation of the B,C,D types may be thus summarized: an electromagnetic wave shown by heavy type arrows in FIG. 1 and represented by a spectral function f(k) incides on optical element S of FIG. 1. A portion of this wave, represented by a spectral function $f_r(k)$, is reflected while another portion ($f_t(k)$) is transmitted. The reflected and transmitted portions are indicated by two light type arrows in FIG. 1. The above functions $f_r(k)$ and $f_t(k)$ are correlated to function f(k) through the following equations:

$$f_t(k) = T(k)f(k-k')dk'$$

$$f_r(k) = R(k)f(k=k')dk'$$

wherein T(k) and R(k) are the respective transmission and reflection spectral functions of the interferometer.

The spectral properties of the above spectrometers are determined by the optical characteristics and by the reciprocal distances of the reflecting surfaces. The element whereby the optical elements of the system are coupled to one another and whereby the incident beam is admitted to the interferometer and the outcoming beams are drawn therefrom, will be called "deviator" hereinafter. In interferometers B,C,D the optical deviator indicated by S in FIG. 1, usually comprises a plate of suitable transparent material of which one or both the faces are coated by reflecting and or reflection-preventing material.

Such deviator, due to its coating, can have the drawback of a low damage threshold at high light intensities and of a spectral field restricted by the layers deposited on its surfaces.

Such limitations can be obviated by the solution herein proposed of replacing plate S by prisms of suitable material or by diffraction gratings functioning as reflecting gratings. When a prism is used, both its damage threshold and its spectral band is limited only by the properties of the optical material employed so that interferometers can be obtained thereby which have a good fineness adapted for operating in the range from 120 nm to the far infrared.

In the case of the present invention, because the prism surfaces are not coated in any way, the damage thresholds are much higher than with coated prisms and the only limitation of the spectral field depends on the transmission properties of the prism optical material.

By replacing plate S with a grating, due to the dispersive properties of the latter, the limitation can be overcome which consists of the periodical character of the spectral response of the above mentioned interferometers.

By the use of reflecting surfaces of the diffractive type, such interferometers can be realized which have a good spectral resolution also in the X band. The developement of interferometers of the B,C,D type wherein prisms or gratings of suitable characteristcs are used as elements S, is a way, as evidenced by experimental results, for producing high power laser cavities operating in a single mode. In such cavities the interferometers herein described are employed as output couplers in lieu of the semitransparent mirror usually employed (FIG. 2).

This invention will be more readily understood from the following description and attached drawings which illustrate by way of examples two main embodiments and several variants thereof. In the drawings.

Figure 3:
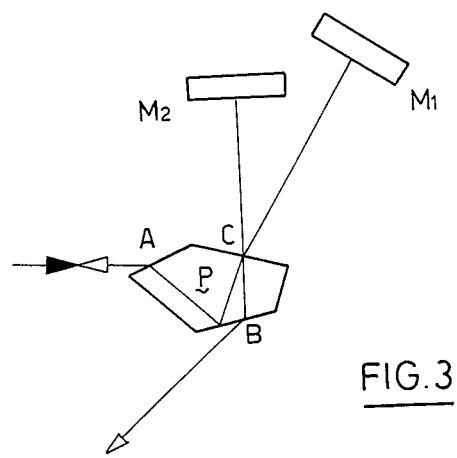
FIGS. 3, 4 and 5 show the prism interferometers according to this invention which are referable to the optical configurations B,C,D, of FIG. 1.
Figure 4:
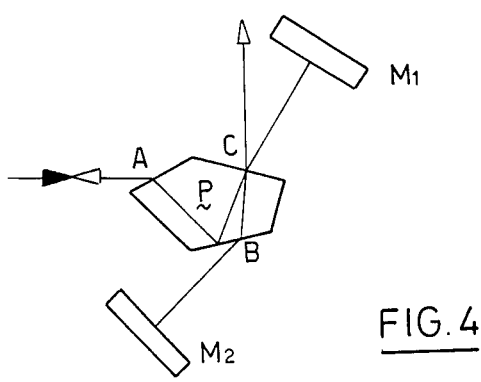
Figure 5:
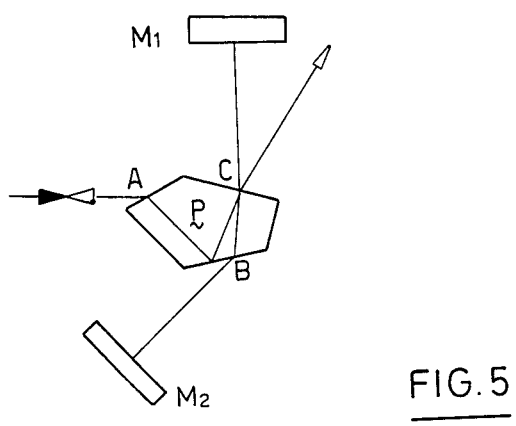

With reference to the drawings and particularly to FIGS. 3, 4 and 5 the first embodiment will be described which relates to an interferometer wherein the optical deviator comprises a prism which is utilized as a substitute for plate S of interferometer types B, C, D of FIG. 1.

Figure 1:
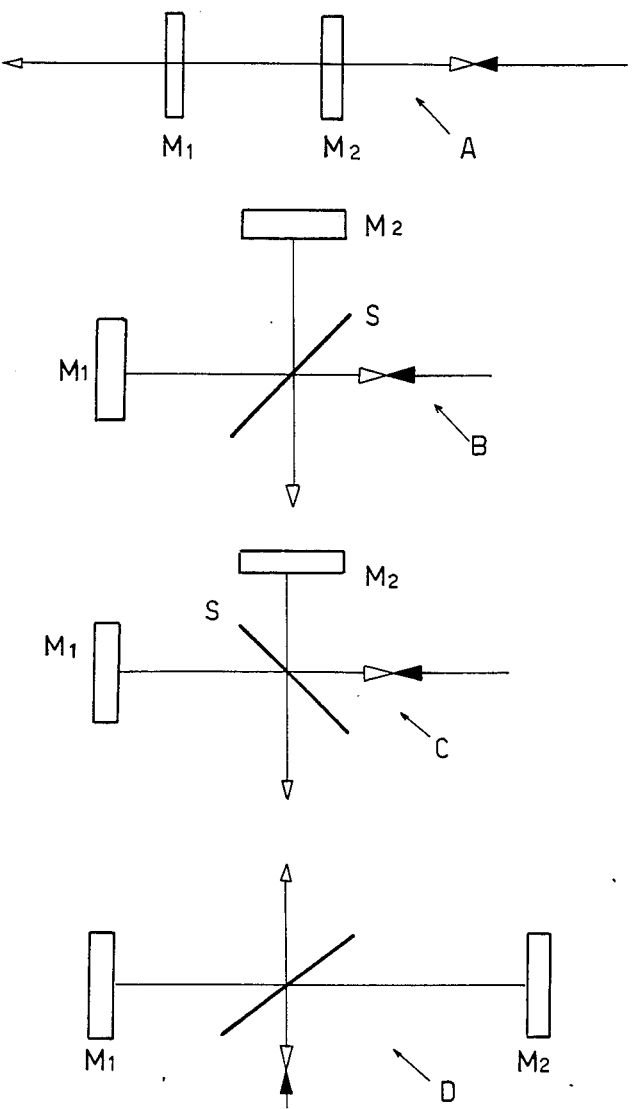
FIG. 1 shows in the order, in a very simplified form, the optical diagrams (A,B,C,D) of the known Fabry-Perot, Fox-Smith, Michelson and Petrun'kin interferometers.

By utilizing prism P as optical deviator, configurations B, C,D of FIG. 1 are changed into the configurations of FIGS. 3, 4 and 5. Three faces of prism P to be used in lieu of plate S in the above three interferometers of FIG. 1 must satisfay the following requirements: a beam incident at Brewster angle on face A, following penetration into the prism, following possible total reflections, following reflection by face C and further possible total reflections must include on face B at Brewster angle. The spectral functions T(k) and R(k) are determined by the angle and polarization of the incident beam on face B, by the optical distance between mirrors M1,M2 and face C, by their reflectivities and obviously by the chosen configuration. The different configurations B, C, D are obtainable by varying the positions of mirrors M1 and M2 with respect to the three progressing beams.

CONFIGURATION "a" (FIG. 3)

A light beam inciding on face A at a Brewster angle, after being totally reflected by face B, hits face C where it splits into two beams: a reflected one and a transmitted one. The reflected one emerging from face B at a Brewster angle, is part of the interferometer transmitted beam; the transmitted one orthogonally reflects on mirror M1 and then again on face C where it splits again into two beams. The transmitted part re-enters the prism, emerges from face A and is part of the interferometer reflected beam. The reflected part incides orthogonally on mirror M2 and then incides again on face C where it splits again into two parts. The reflected part incides on mirror M1 and begins again the above optical path, while the transmitted one, emerging from face B, adds to the interferometer transmitted beam.

CONFIGURATION "b" (FIG. 4)

A light beam inciding on face A at a Brewster angle, after total reflection on face B, hits face C where it splits into two parts: a reflected one and a transmitted one. The reflected one, after crossing face B at Brewster angle, and after inciding orthogonally on mirror M2 crosses again face B and incides on face C where it splits into two parts: a transmitted part and a reflected part; the transmitted part is part of the interferometer transmitted beam while the reflected part, emerging from face A, is part of the reflected beam.

The transmitted part of the beam initially inciding on face C, incides orthogonally on mirror M1 and after reflection thereon incides again on face C where it splits into two parts: a transmitted one and a reflected one. The transmitted one, after total reflection on B and after refraction through A, is part of the interferometer reflected beam while the reflected part is part of the interferometer transmitted beam.

CONFIGURATION "c" (FIG. 5)

A light beam incident on face A at Brewster angle, after total reflection of face B incides on face C where it splits in two parts; a transmitted one and a reflectted one. The transmitted part is part of the beam transmitted by the interferometer. The reflected part emerges from face B at Brewster angle, it incides orthogonally on mirror M2, it crosses again face B and then incides on face C where it splits again in two parts a reflected one and a transmitted one. The reflected part, after the total reflection on face B and refraction through face A emerges from the prism as part of the interferometer reflected beam. The transmitted part after orthogonally inciding on mirror M1, incides again on face C where it splits further in two parts: a transmitted one and a reflected one. The transmitted one, after refraction through face B, incides on mirror M1 and begins again the above described optical path. The reflected part is part of interferometer transmitted beam.

Figure 6:
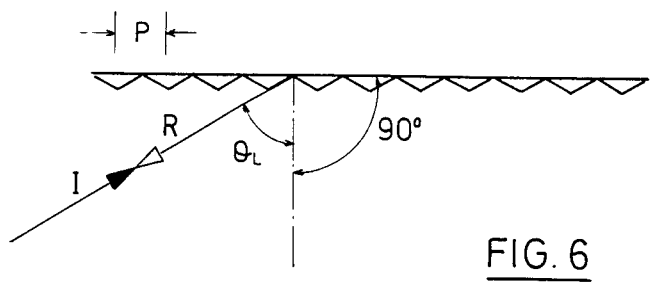
FIG. 6 is a diagram which shows how one or both the mirrors M1 and M2 of the interferometers of FIGS. 3, 4, 5 can be replaced by diffraction gratings functioning as reflectors (Littrow configuration).

In the three above described prism-equipped configurations, mirrors M1 and M2 can be replaced both or only one by suitable diffraction gratings which operate as reflectors (Littrow's configuration of FIG. 6). When a grating operates according to a Littrow configuration, beam R proceeds in the same direction but contrariwise of the incident beam I and is identified as reflected beam R. Such behaviour may occur at many or at only one or at none incidence angle $\theta_L$, this being dependent solely on vector k of the incident beam and on the grating constant.

The second embodiment of the invention will be now described, that is the grating interferometer, in a number of variants thereof as illustrated in FIGS. 8, 9, 10, 11, 12, 12a, 12b, 14, 14a, 15, 15a, 16, 16a.

Figure 7:
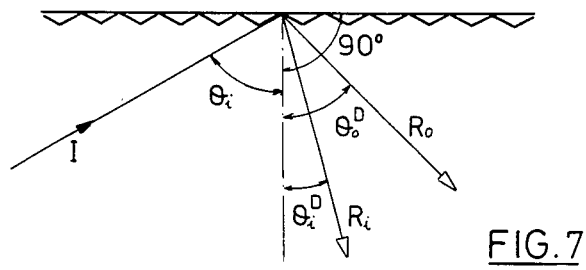
FIG. 7 is a diagram which shows the operation of a diffraction grating and how it can be used as deviator element in an interferometer.

With reference to FIG. 7, the operating principle of a grating when employed as deviator in an interferometer is as follows:

An incident beam on grating C produces a series of emergent beams $R_i$ characterized by the following generic spectral function.

$$f_i(k) = \int F_i(k)f(k-k')dk'$$

wherein $F_i(k)$ is the reflection spectral function of the grating related to the $i^{th}$ order and f(k) that related to the incident beam. The existence of diffracted beams of the order i≠0, $f_i(k)$ being different from zero, depends on the grating constant p, on the incidence angle $\theta_i$ and on the wave vector k of the incident beam I. The diffracted beam characterized by spectral function $f_o(k)$ still exists..

Such beam indicated by $R_o$ in FIG. 7 has the property that $\theta_i = 0_o^D$ that is diffraction angle does not depend on $\theta_i$ nor on k and such diffractive order can be understood as a reflection of the Fresnel type. The beam which in FIG. 7 is indicated by $R_{i'}$ represents the beam related to the generical diffraction order i with 0<i'<n wherein n is the maximum diffraction order existing in the chosen optical configuration. The grating interferometers corresponding to the conventional types B,C,D of FIG. 1 can be described the same way as for the above prism interferometers provided that the beams transmitted and reflected by face C of the prism be replaced respectively by the "reflected" beam $R_o$ and by the refracted beam $R_i$ of the grating. It is to be born in mind that in the case of a grating, by the term "reflected" - between commas- the specular component is meant of the beams reflected by the grating. In this case the spectral characteristics of interferometers B,C,D of FIG. 1 are determined by the angle and polarisation of the incident beam, by the grating characteristics, by the chosen order $R_i$ and by the interferometer configuration.

The above mentioned variants of grating interferometers according to the invention will be now described.

Figure 8:
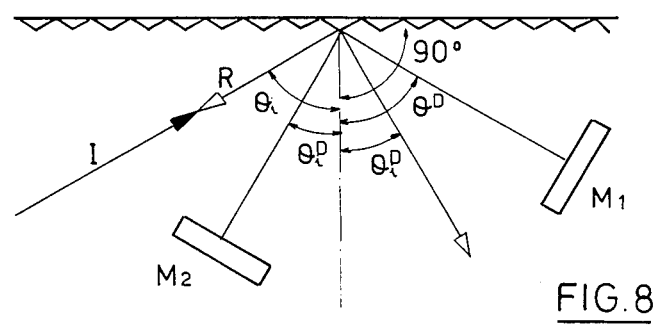
FIGS. 8, 9, 10 are the optical diagrams of the B, C, D (that is Fox-Smith, Michelson and Petrun'kin ) interferometers wherein the deviator element is replaced by a diffraction grating.

CONFIGURATION a' (FIG. 8)

A light beam inciding on the grating surface at an angle $\theta_i$; splits in a "reflected" part and in one or more diffracted parts. The diffracted part of the generical i order is part of the interferometer transmitted beam. The diffracted part of i order is orthogonally reflected by mirror M2 and returned to incide on the grating wherein it splits again in more parts. The reflected part is part of the interferometer transmitted beam. The diffracted part of i order is returned to reflect on M1 wherefrom it begins its above described optical path.

Figure 9:
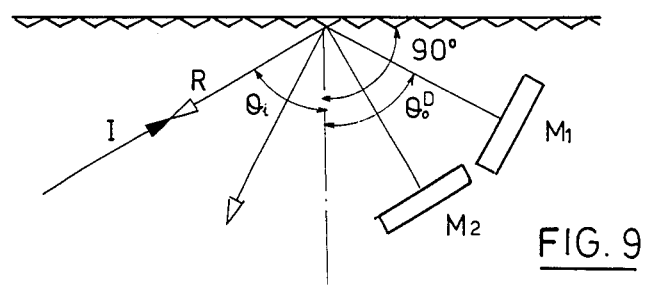

CONFIGURATION b' (FIG. 9)

A light beam inciding on the grating surface splits into a "reflected" part and one or more diffracted parts. The "reflected" part, following orthogonal reflection by mirror M1 incides again on the grating. Said "reflected" part is part of the interferometer reflected beam while the diffracted part is part of the interferometer transmitted beam. That part initially diffracted by the grating on i order, following orthogonal reflection on mirror M2 incides again on the grating and splits again in several parts. The diffracted part of i order proceeds to form the interferometer reflected beam.

Figure 10:
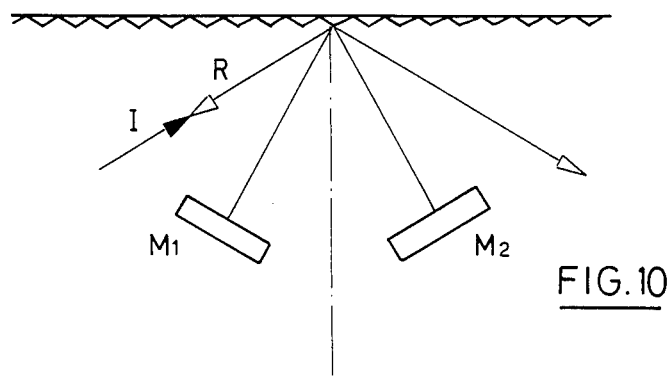

CONFIGURATION c' (FIG. 10)

A light beam inciding on the grating surface splits into a "reflected" part and into one or more diffracted parts. The "reflected" parts proceeds to form the interferometer transmitted beam. The diffracted part of i order, following orthogonal reflection on mirror M2 incides again on the grating where it splits into two or more parts. The diffracted part of order i proceeds to form the interferometer reflected beam. The "reflected" part, following orthogonal reflection on mirror M1 incides again on the grating. The diffracted part proceeds to form the interferometer transmitted beam while the reflected part reflects on mirror M2 wherefrom it begins the above described optical path.

From the above discussion it clearly appears that the diffracted orders $R_i$ and the reflected one $R_o$, when suitably combined, can give way to interferomemetric configurations different from those of FIGS. 8,9,10.

Figure 12:
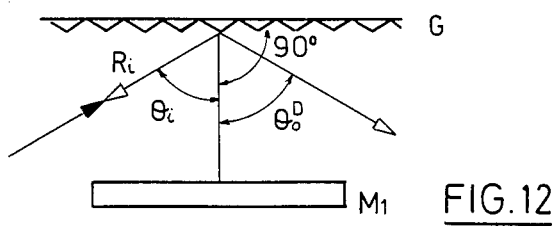
FIG. 12 shows a grating interferometer wherein a grating and a mirror are included which face each other parallel to one another.

For instance:

CONFIGURATION d' (FIG. 12)

Figure 12B:
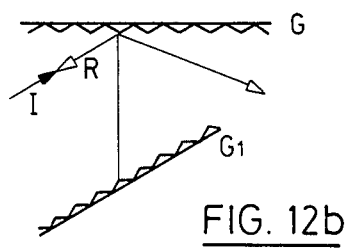
FIG. 12b shows an interferometer whose diagram is the same as in FIG. 12 and wherein the mirror is replaced by a grating; the two gratings being at Littrow angle with respect to one another.
Figure 12A:
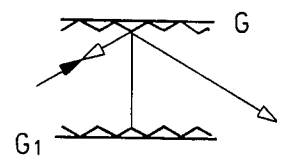
FIG. 12a shows a grating interferometer whose diagram is the same as in FIG. 12 and wherein the mirror is replaced by a grating which faces grating 4 of FIG. 12 parallel thereto.

This interferometer which derives from type A of FIG. 1 comprises a grating G and a mirror M1 parallel facing each other. Its operation is as follows: a beam incides on grating G where it splits into two or more parts: a reflected one and diffracted one. The reflected part forms the interferometer transmitted beam. The diffracted part $R_i$ of order i emerges from the grating at an angle $\theta_i = 0$ and proceeds to reflect orthogonally on mirror M1 and to incide again orthogonally on the grating. The diffracted part emerging leftwards in FIG. 12 proceeds to form the interferometer reflected beam. The "reflected" part begins again the above optical path. Mirror M1 may be replaced by a grating disposed in the same position as M1 (FIG. 12a) or at a Littrow angle (FIG. 12b).

Figure 13:
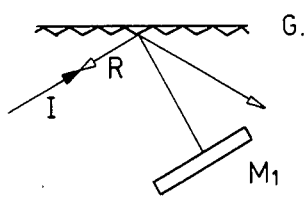
FIG. 13 shows a grating interferometer wherein a grating and a mirror are included which are disposed at Littrow angle to one another.
Figure 13B:
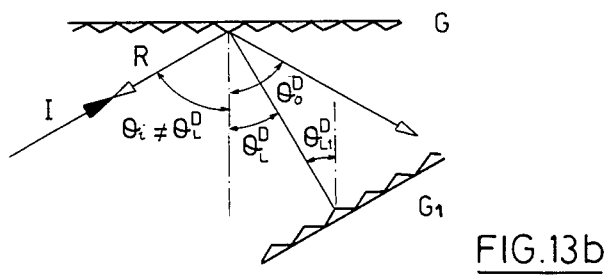
FIG. 13b shows the diagram of an interferometer similar to FIG. 13 wherein the mirror is replaced by a grating at Littrow angle with the other grating.

CONFIGURATION e' (FIG. 13b)

Figure 13A:
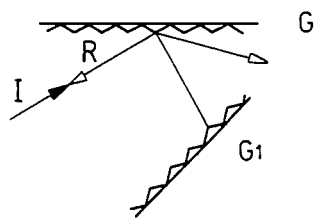
FIG. 13a shows the diagram of a grating interferometer comprising a grating which faces another grating at an angle such that it results in Littrow with respect to the incident beam.

This interferometer comprises a grating G facing another grating $G_1$. Grating $G_1$, provided that its constant is the same as of grating G, will be parallel faced thereto while when its constant is different it will be faced to G so as to be at Littrow angle with respect to the incident beam (FIG. 13a).

Grating $G_1$ may also be replaced by a mirror M1 orthogonally positioned with respect to the incident beam.

Operation: A beam incides on grating G at an angle different from Littrow angle $\theta_L$ giving rise to a "reflected" beam and to a plurality of diffracted beams of which one at Littrow angle $\theta_L$. The "reflected" part proceeds to form the transmitted part of the interferometer. The part diffracted at Littrow angle, after inciding at Littrow angle on grating $G_1$ turns back to incide still at Littrow angle on grating G. The leftwards (in FIG. 13b) diffracted part proceeds to form the interferometer reflected beam. The part diffracted at Littrow angle turns back to follow again the described optical path.

Figure 14:
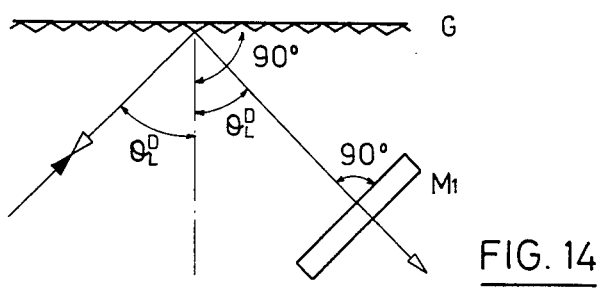
FIG. 14 shows the diagram of a grating interferometer wherein a grating and a partially reflecting mirror are included; the mirror face being perpendicular to the beam from the grating.

CONFIGURATION f' (FIG. 14)

Figure 14A:
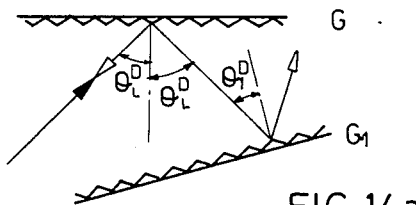
FIG. 14a shows the diagram of a grating interferometer similar to that of FIG. 14 wherein the mirror is replaced by a second grating facing the first one at Littrow angle.

It comprises a partially reflecting mirror M1 orthogonal to the beam emerging from a grating G. The operation is as follows: a beam inciding on grating G at Littrow angle splits into two or more parts. The part diffracted leftwards (in FIG. 14) at Littrow angle to the normal forms part of the interferometer reflected beam. The rightwards (in FIG. 14) diffracted part at Littrow angle incides orthogonally on mirror M1 where it splits in two parts: a transmitted one and a reflected one. The transmitted part forms part of the interferometer transmitted beam, the reflected part incides again on grating C where it splits again into more parts. The part diffracted leftwards (in FIG. 14) at Littrow angle proceeds to form the interferometer reflected beam. The part diffracted rightwards, also at Littrow angle returns towards mirror M1 and begins again the above described optical path. Mirror M1 may be replaced by a second grating $G_1$ disposed at Littrow angle (FIG. 14a).

Figure 15:
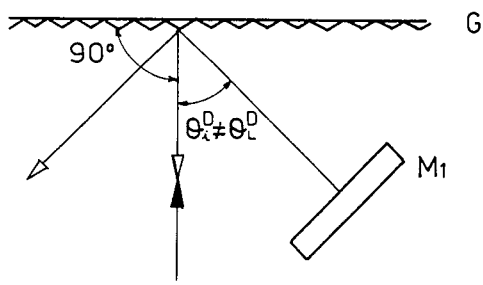
FIG. 15 shows the diagram of a grating interferometer wherein a grating and a mirror are included and wherein the entering beam is directed perpendicularly to the grating surface.

CONFIGURATION g' (FIG. 15)

Figure 15A:
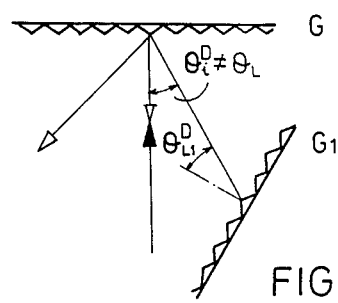
FIG. 15a shows the diagram of a grating interferometer similar to FIG. 15 wherein the mirror is replaced by a grating which operates at Littrow angle.

It comprises a diffraction grating G and a mirror M1, the direction of the entering beam being orthogonal to the grating surface. The operation is as follows: a beam orthogonally incident on grating G splits in three or more parts. The orthogonally "reflected" part proceeds to form the interferometer reflected beam; the diffracted part of order i directed rightwards (in FIG. 15) orthogonally incides on mirror M1 and then returns on grating G where it splits again into more parts. The reflected part proceeds to form the transmitted beam of the interferometer and the diffracted part of order i is constituent part of the interferometer reflected beam. Mirror M1 may be replaced by a grating $G_1$ operating at Littrow angle (FIG. 15a).

Figure 16:
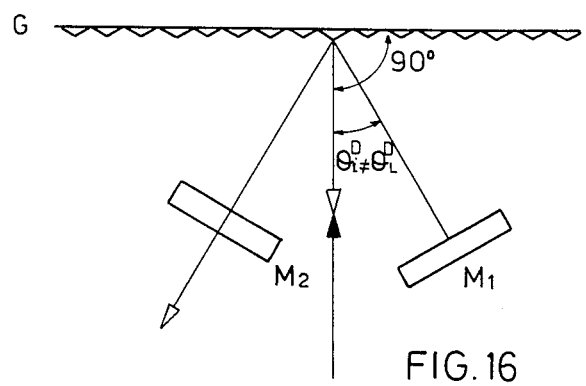
FIG. 16 shows the diagram of a grating interferometer wherein a grating and two mirrors are included one of which is partially reflecting.
Figure 16A:
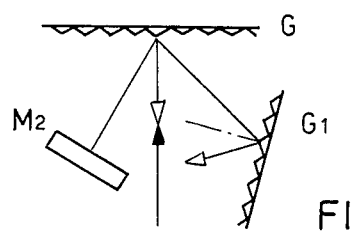
FIG. 16a shows a grating interferometer similar to FIG. 16 wherein the partially reflecting mirror is replaced by a grating which operates at Littrow angle.

CONFIGURATION h' (FIG. 16)

It comprises two mirrors M1 and M2, of which one is partially reflecting and a grating G. The operation is as follows: a beam orthogonally inciding on grating $G_1$ at an angle $\theta_i$ different from $\theta_L$ splits into three or more parts. The orthogonally reflected part is part of the interferometer reflected beam. The part of order i diffracted leftwards (in FIG. 16) orthogonally reflectts on mirror M2 and then it incides again on the grating where it splits in more parts. The diffracted part of order i makes part of the interferometer reflected beam. The reflected part together with the initially rightwards (in FIG. 16) diffracted one orthogonally reflects on mirror M1 and incides again on grating G where it splits into more parts. The diffracted part of order i is part of the interferometer reflected beam while the reflected part begins again the above optical path.

In the above configuration (FIG. 16) both or only one of the mirrors may be replaced by gratings operating at Littrow angle. Thus, for instance the configuration of FIG. 16a may be obtained.

The optical characteristics of the grating interferometers of FIG. 12 and 13 are similar to those of the configuration of FIG. 10. The characteristics of the grating interferometer of FIG. 15 are similar to the interferometer of FIG. 9. The characteristics of grating interferometers of FIGS. 14 and 16 are similar to the interferometer of FIG. 1A.

In all the above described grating or prism interferometers the mirrors may both or only one be replaced by diffraction gratings of suitable characteristics which operate by reflection (Littrow configuration of FIG. 6).

EXAMPLE 1 (FIG. 2).

Figure 2:
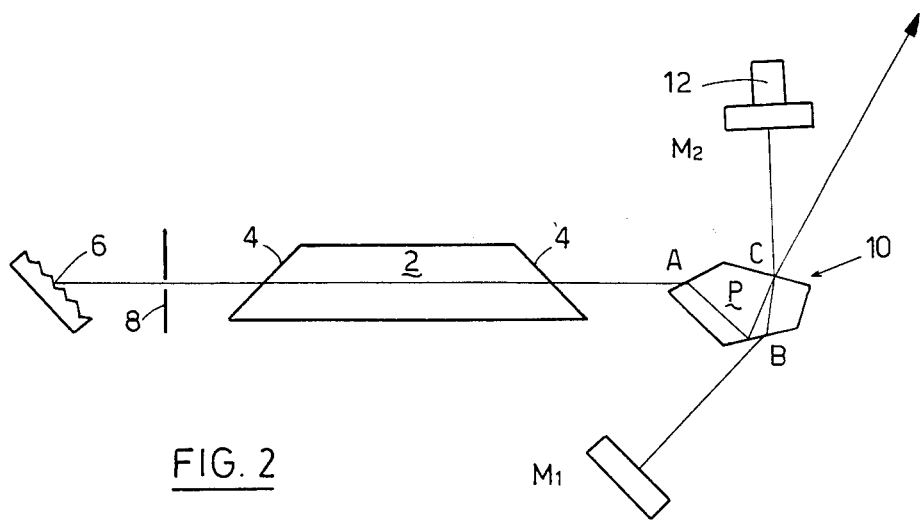
FIG. 2 shows a prism interferometer according to this invention employed as output coupler in a high power single mode laser.
Figure 11:
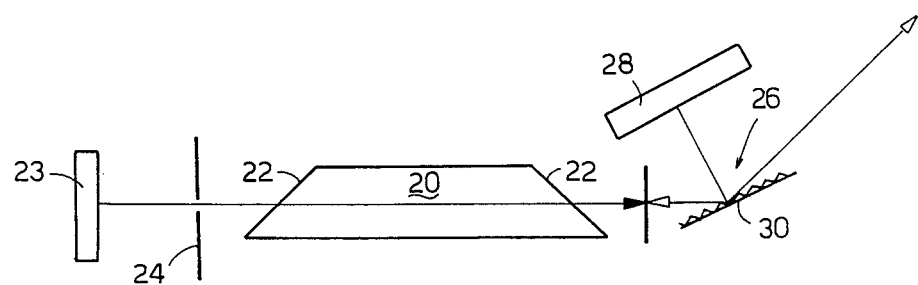
FIG. 11 shows how the grating interferometer of FIG. 12 can be used as output coupler in an XeF laser.

A prism interferometer 10 of the same type as of FIG. 5 (Petrun'kin) has been utilized as an output coupler in a $CO_2$ power laser operating at atmospheric pressure for obtaining a tunable laser emission with very narrow spectral width. The laser cavity, shown in FIG. 2, comprises: a tube 2 with transversely excited discharge through $CO_2$ mixture which tube is closed at each end by a ZnSe window 4 at Brewster angle; a diffraction grating 6 with 90 lines for mm operating at Littrow configuration; an iris 8 for regulating the quality of the laser beam transverse profile; an interferometer 10 of the type of FIG. 5 wherein mirror M2 is mounted on a piezoelectric support whereby it can be translated along the incident beam direction, said interferometer constituting the output mirror of the laser cavity.

The interferometer prism P complies with the specifications set forth above when the configurations of FIGS. 3, 4, 5 have been discussed. By an interferometer 10 having a spectral periodicity interval of 2.7 GHz and a fineness of 15 a laser operation has been obtained on a single longitudinal and transverse mode with a line width lower than 11 MHz within the emission band from 9 to 11 micron.

By a combined rotation of the grating and translation of mirror M2 the laser frequency w has been tuned through the gain band of every single roto-vibrational line emitted within the spectral region from 9 to 11 micron.

EXAMPLE 2 (FIG. 11).

A grating interferometer as shown in FIG. 12 has been utilized as output coupler in a XeF laser operating in the uv band at 350 nm for producing a laser emission tunable with a very narrow spectrum width. The apparatus comprised: a laser cavity consisting of a tube 20 wherein a mixture of Xe and $F_2$ was excited by a transverse discharge and which was closed at each end by a quartz window; a dielectric flat mirror 23 with 99% reflectivity; an iris 24 for regulating the quality of the laser beam transverse profile; an interferometer 26 of the type shown in FIG. 12a which comprised a high reflectivity dielectric mirror 28 and a diffraction holographic grating 30 with 2400 lines for mm which interferometer consituted the output mirror of the laser cavity. By interferometer 26 whose spectral periodicity was 7.5 GHz with a fineness of 13 a single and transverse mode of the laser operation has been obtained with a line width lower than 50 MHz. By micrometric rotation of grating interferometer 26, the laser frequency emitted by the same on a spectral band of 1.5 nm could be tuned. Two embodiments and related variants of the invention have been thus described. Presumably many modifications thereof can be envisaged by those skilled in the art. However any such modifications which will be made in the true spirit of the invention are to be considered as being included in the following claims.

We claim:

1. An interferometer comprising a diffraction grating and first and second mirrors, said components being so disposed that the light beam inciding on the grating surface splits into a first reflected part and one or more diffracted parts and that the diffracted part of a given order constitutes part of the interferometer transmitted beam while said first reflected part incides orthogonally on said first mirror and reflecting thereby reincides on the grating surface where it splits into a second reflected part as a constituent part of the interferometer reflected beam and into more diffracted parts of which one, of the above given order, orthogonally incides on said second mirror and is reflected thereby, reinciding on the grating surface where it splits into a third reflected part as constituent part of the interferometer transmitted beam and into one or more diffracted parts of which one, of the above given order, orthogonally incides on said first mirror whereby the latter part begins again the path already traveled.

2. An interferometer which comprises a diffraction grating and first and second mirrors: said components being so disposed that the light beam incident on the grating surface splits into a first reflected part and into one or more diffracted parts, that the part diffracted on a given order is orthogonally reflected by said first mirror, reinciding on the grating and splitting into a second reflected part as constituent part of the interferometer transmitted beam and into more diffracted parts of which one, of the above given order is constituent part of the interferometer reflected beam and that said first reflected part is orthogonally reflected by said second mirror, reinciding on the grating and there splitting into a third reflected part as constituent part of the interferometer reflected beam and into one or more refracted parts of which one, of the above given order is constituent part of the interferometer transmitted beam.

3. An interferometer which comprises a diffraction grating and first and second mirrors, said components being so disposed that the light beam incident on the grating splits into a first reflected part as constituent part of the interferometer transmitted beam and into more diffracted parts of which one, of a given order, orthogonally reflects on said first mirror, returns to the grating and splits into more diffracted parts of which one, of the said given order is constituent part of the interferometer reflected beam and into a second reflected part which orthogonally reflects on said second mirror, reinciding on the grating where it splits into one or more diffracted parts of which one of said given order is constituent part of the interferometer transmitted part and into a third reflected part which orthogonally incides on said first mirror and reflects thereon; whereby said third reflected part begins again the formerly traveled path.

4. An interferometer comprising a diffraction grating and a mirror; said components being so disposed with respect to the direction of a light beam incident on the grating that said beam splits into a first reflected part as constituent part of the interferometer transmitted beam and into one or more diffracted parts of which one, on a given order, emerges orthogonally to the plane tangential to the grating at the incidence point, incides orthogonally on the mirror and following reflection by the same mirror returns to the grating where it splits into one or more diffracted parts of which one of said given order is a constituent part of the interferometer beam selected from the group consisting of the reflected beam, transmitted beam and combination of both and into a second reflected part which orthogonally incides on said mirror and is reflected by the same, whereby said second reflected part begins again the previously travelled path.

5. The interferometer as claimed in claim 4 wherein said part diffracted on a given order is at Littrow angle to the same order.

6. An interferometer comprising a diffraction grating and a semitransparent mirror so disposed that a light beam incident on the grating at Littrow angle for a given order originates one or more diffracted beams of which one, of said given order, is constituent part of the interferometer reflected beam while a first reflected part by the grating, orthogonally inciding on said semitransparent mirror, originates a beam transmitted by the mirror as constituent part of the interferometer transmitted beam and a reflected part which incides on the grating where it splits into a second reflected part as constituent part of the interferometer reflected beam and into one or more diffracted parts of which one, of the above given order, orthogonally incides on said semitransparent mirror whereby the part last cited begins again the previously traveled path.

7. An interferometer comprising a grating and first and second mirrors of which at least one is semitransparent which grating and mirrors are so disposed that a light beam orthogonally incident on said grating originates a first reflected part as constituent part of the interferometer reflected beam and one or more diffracted parts of which one, of a given order, orthogonally incides on said first mirror and, being reflected thereby, originates a beam which reincides on said grating where it splits into one or more diffracted beams of which one, of said given order, is constituent part of the interferometer reflected beam and into a second reflected part which by orthogonally inciding on said semitransparent mirror originates a transmitted part as constituent part of the interferometer transmitted beam and a third reflected part which, by inciding on the grating, splits into one or more diffracted parts of which one, of the above given order, is constituent part of the interferometer reflected beam and into a fourth reflected part which, orthogonally inciding on said first mirror, reflects on it whereby said part last cited begins again the path previously traveled.

8. An interferometer comprising a diffraction first grating and a second grating; said components being so disposed with respect to the direction of a light beam incident on said first grating that said beam splits into a first reflected part as constituent part of the interferometer transmitted beam and into one or more diffracted parts of which one, on a given order, emerges orthogonally to the plane tangential to said first grating at the incidence point, incides orthogonally on said second grating and following reflection by said second grating returns to said first grating where it splits into one or more diffracted parts of which one of said given order is a constituent part of the interferometer beam selected from the group consisting of the reflected beam, transmitted beam and combination of both and into a second reflected path which orthogonally incides on said second grating and is reflected by the same, whereby said second reflected part begins again the previously travelled path.

9. The interferometer as claimed in claim 8 wherein said part diffracted on a given order is at Littrow angle to the same order.

10. The interferometer as claimed in claim 9 wherein said second grating operates at Littrow on said given order.

11. The interferometer as claimed in claim 8 wherein said second grating operates at Littrow on a given order.

12. The interferometer as claimed in claim 8 wherein said second grating facing said first grating is so disposed that the planes tangential to the surfaces of the two gratings at the incidence point of the beam are parallel to each other.

13. An interferometer comprising a diffraction first grating and a second grating so disposed that a light beam incident on the grating at Littrow angle for a given order originates one or more diffracted beams of which one, of said given order, is constituent part of the interferometer reflected beam while a first reflected part by the grating, orthogonally inciding on said second grating, originates a beam transmitted by said second grating as constituent part of the interferometer transmitted beam and a reflected part which incides on said first grating where it splits into a second reflected part as constituent part of the interferometer reflected beam and into one or more diffracted parts of which one, of the above given order, orthogonally incides on said second grating whereby the part last cited begins again the previously traveled path.

14. The interferometer as claimed in claim 13 wheein said second grating operates at Littrow on a given order.

* * * * *